US012063464B2

(12) United States Patent

Kondo et al.

(10) Patent No.: US 12,063,464 B2
(45) Date of Patent: Aug. 13, 2024

(54) SPEAKER BRACKET, SPEAKER FRAME, AND SPEAKER

(71) Applicants: PIONEER CORPORATION, Tokyo (JP); TOHOKU PIONEER CORPORATION, Tendo (JP)

(72) Inventors: Hayami Kondo, Tendo (JP); Ryu Ito, Tendo (JP); Shun Shirahata, Tendo (JP); Masato Tsuruya, Tendo (JP); Hiroyuki Dohi, Tendo (JP)

(73) Assignees: PIONEER CORPORATION, Tokyo (JP); TOHOKU PIONEER CORPORATION, Tendo (JP)

(*) Notice: Subject to any disclaimer, the term of this patent is extended or adjusted under 35 U.S.C. 154(b) by 29 days.

(21) Appl. No.: 17/829,694

(22) Filed: Jun. 1, 2022

(65) Prior Publication Data

US 2023/0396905 A1 Dec. 7, 2023

Related U.S. Application Data

(63) Continuation of application No. 17/059,175, filed as application No. PCT/JP2019/020896 on May 27, 2019, now Pat. No. 11,381,893.

(30) Foreign Application Priority Data

May 30, 2018 (JP) ................................ 2018-103615

(51) Int. Cl.
*H04R 1/02* (2006.01)
*H04R 7/18* (2006.01)

(52) U.S. Cl.
CPC ............... *H04R 1/02* (2013.01); *H04R 1/025* (2013.01); *H04R 7/18* (2013.01); *H04R 2400/11* (2013.01); *H04R 2499/13* (2013.01)

(58) Field of Classification Search
CPC ..... B60R 2011/0066; B60R 2011/0223; B60R 11/0217; B60R 11/0223;
(Continued)

(56) References Cited

U.S. PATENT DOCUMENTS 4,550,796 A * 11/1985 Tomita ............... B60R 11/0217 381/86
8,023,684 B2 9/2011 Wathen
(Continued)

FOREIGN PATENT DOCUMENTS

EP 2214417 A1 8/2010
JP S58-28485 U 2/1983
(Continued)

OTHER PUBLICATIONS

International Search Report for related JP App. No. PCT/JP2019/020896 dated Aug. 6, 2019. English translation provided; 4 pages.
(Continued)

*Primary Examiner* — Carolyn R Edwards
*Assistant Examiner* — Julie X Dang
(74) *Attorney, Agent, or Firm* — PROCOPIO, CORY, HARGREAVES & SAVITCH LLP

(57) ABSTRACT

Provided is a bracket for a speaker, the bracket being capable of ensuring the strength when the speaker is attached by using an attachment plate, and also enhancing the workability in folding of the attachment plate when the speaker is attached without using the attachment plate.
The present invention includes: a frame-shaped support portion 10 which supports a speaker; and a mounting member 20 which is used for attaching the speaker supported by the support portion 10 to the outside and is provided in the support portion 10, wherein a plurality of grooves having different extension directions are continuously formed on a base part of the mounting member 20, the base part connecting the mounting member 20 and the support portion 10.

20 Claims, 9 Drawing Sheets

(58) Field of Classification Search

CPC ..... B60R 2011/0024; B60R 2011/0043; B60R 2011/0021; H04R 2499/13; H04R 1/025; H04R 1/02; H04R 2201/021; H04R 31/006; H04R 1/06; H04R 9/06; H04R 1/20; H04R 9/04; H04R 1/00; H04R 1/24; H04R 25/00; H04R 7/16; H04R 7/18; H04R 499/13

See application file for complete search history.

(56) References Cited

U.S. PATENT DOCUMENTS

| | | | | |
|---|---|---|---|---|
| 11,381,893 | B2 * | 7/2022 | Kondo | H04R 1/02 |
| 2004/0037445 | A1 * | 2/2004 | Kirihara | H04R 1/025 381/86 |
| 2004/0247150 | A1 * | 12/2004 | Iwaya | H04R 1/025 381/389 |
| 2005/0152569 | A1 | 7/2005 | Ono et al. | |
| 2007/0154054 | A1 * | 7/2007 | Hayasaka | H04R 1/025 381/386 |
| 2010/0086168 | A1 | 4/2010 | Horigome et al. | |

FOREIGN PATENT DOCUMENTS

| | | | |
|---|---|---|---|
| JP | S61-156394 | U | 9/1986 |
| JP | H1-10068 | Y | 3/1989 |
| JP | H6-005291 | U | 1/1994 |
| JP | 2007251409 | A | 9/2007 |
| WO | 2009050937 | A1 | 4/2009 |

OTHER PUBLICATIONS

Kenwood's instruction manual, "KFC-XP184C," released in 2012; 2 pages.

* cited by examiner

FG. 6(a)

SPEAKER BRACKET, SPEAKER FRAME, AND SPEAKER

TECHNICAL FIELD

The present application belongs to the technical fields of speaker brackets, speaker frames, and speakers. More specifically, the present application belongs to the technical fields of speaker brackets, speaker frames, and speakers, including a structure for attaching a speaker to an external portion (for example, the inner side of a vehicle door or the like).

BACKGROUND ART

In general, an in-vehicle speaker is a speaker that is installed at the time of manufacture of a vehicle, or a speaker that is newly installed when the speaker installed at the time of manufacture is removed after the sale of the vehicle, for example.

Here, in the latter case, the configuration or the structure of the portion to which the speaker is attached in the vehicle is designed in conformity with the configuration or the structure for installation in the speaker installed at the time of manufacture, and might not match a configuration or a structure for installing a speaker to be newly installed. Therefore, in such a case, an independent mounting component called a bracket (or an attachment or an adapter; hereinafter, these components will be simply called "brackets") is normally interposed between the speaker and the vehicle, and the speaker to be newly installed is then installed at the position of the original speaker. Examples of prior art documents relating to the structure of such a bracket include Patent Document 1 shown below. A configuration according to the technology disclosed in Patent Document 1 includes a plurality of mounting plates horizontally protruding outward in parallel to the outer circumference of the frame of the speaker, and cutting lines formed on the base edge portions of the plurality of mounting plates. Further, in a case where any mounting plate is not required depending on the structure of the portion to which a speaker is to be newly attached, the speaker is installed after the mounting plates are bent and removed from the above cutting lines.

CITATION LIST

Patent Document

Patent Document 1: JP 1-10068 Y

SUMMARY OF THE INVENTION

Problem to be Solved by the Invention

The above cutting lines disclosed in Patent Document 1 are formed with a plurality of cutting holes arranged to form one line along the above outer circumference of the frame. In a case where the speaker is installed with the mounting plates disclosed in Patent Document 1, however, the strength might become insufficient due to the above cutting holes. Therefore, in a case where the speaker disclosed in Patent Document 1 is installed in another structure (a vehicle, for example), there is a problem that maintaining the strength for installing a speaker with mounting plates and increasing the workability in bending and removing the mounting plates when a speaker is installed without any mounting plate cannot be incompatible.

Therefore, the present application has been made in view of the above problem, and one example objective thereof is to provide a speaker bracket, a speaker frame, and a speaker that are capable of both maintaining the strength for installing a speaker with mounting plates, and increasing the workability in bending and removing the mounting plates or the like when a speaker is installed without any mounting plate.

Means for Solving the Problem

In order to solve the above-mentioned problem, the invention described in claim 1 comprises: a support portion that supports a speaker; and a mounting member that is used for attaching the speaker supported by the support portion to an external portion, the mounting member being formed on the support portion, wherein a plurality of grooves having different extending directions is continuously formed on a base portion of the mounting member, the base portion connecting the mounting member and the support portion.

In order to solve the above-mentioned problem, the invention described in claim 7 comprises: a diaphragm support portion that supports a diaphragm of a speaker; and a mounting member that is used for attaching the speaker having the diaphragm support portion to an external portion, the mounting member being formed on the diaphragm support portion, wherein a plurality of grooves having different extending directions is continuously formed on a base portion of the mounting member, the base portion connecting the mounting member and the diaphragm support portion.

In order to solve the above-mentioned problem, the invention described in claim 8 comprises: a diaphragm support portion that supports a diaphragm; and a mounting member that is formed on the diaphragm support portion, mounting member being for attaching the speaker to an external portion, wherein a plurality of grooves having different extending directions is continuously formed on a base portion of the mounting member, the base portion connecting the mounting member and the diaphragm support portion.

BRIEF DESCRIPTION OF THE DRAWINGS

FIG. 5(*a*) is an enlarged back view thereof; and FIG. 5(*b*) is an enlarged front view showing the configuration of the mounting member of the example.

FIG. 6(*a*) is an enlarged side view thereof; and FIG. 6(*b*) is an enlarged back perspective view showing the configuration of the mounting member.

FIG. 8(*a*) is an enlarged back view showing the configuration of a mounting member of a first modification; and FIG. 8(*b*) is an enlarged back view showing the configuration of a mounting member of a second modification.

FIG. 9(*a*) is an enlarged back view showing the configuration of a mounting member of a third modification; and FIG. 9(*b*) is an enlarged back view showing the configuration of a mounting member of a fourth modification.

MODES FOR CARRYING OUT THE INVENTION

Figure 1:
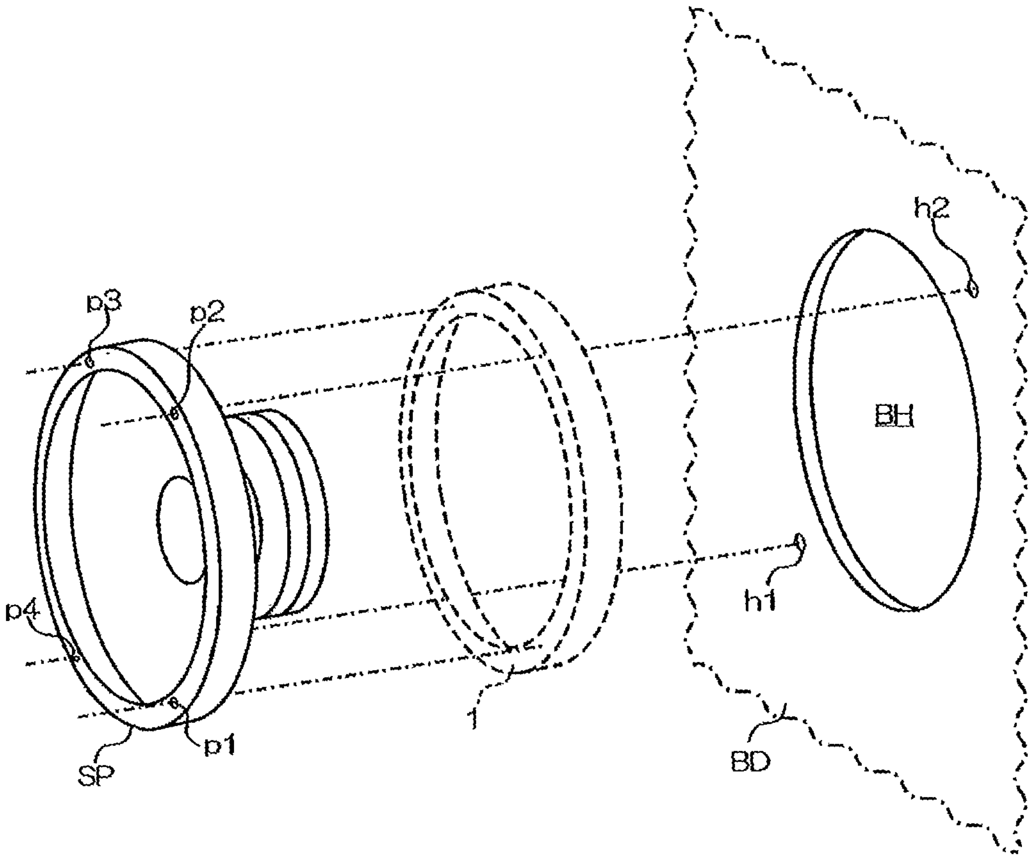
FIG. 1 is an external perspective view showing a usage state and the like of a speaker bracket of an embodiment and an example.
Figure 2:
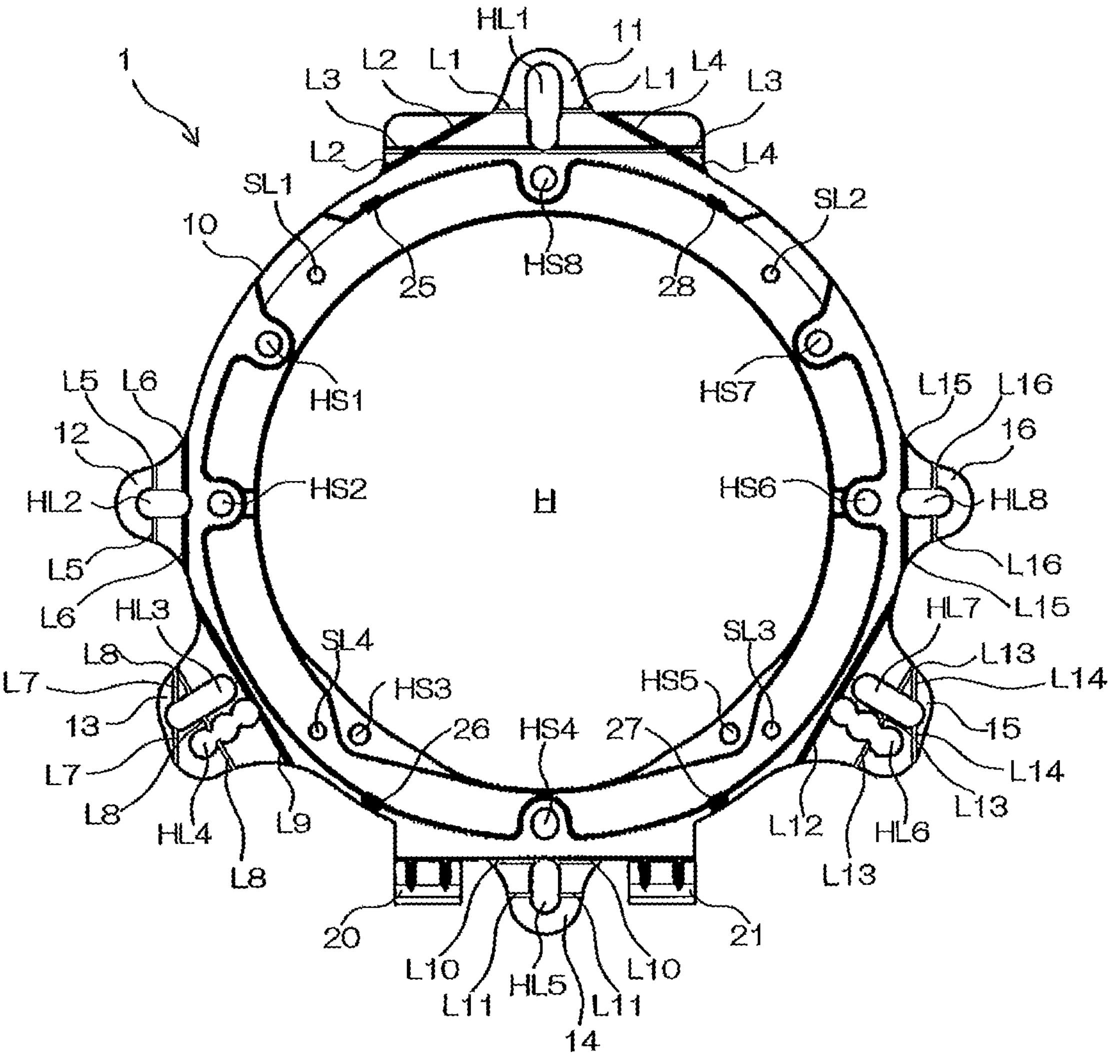
FIG. 2 is a front view showing the configuration of a speaker bracket of an embodiment and an example.
Figure 3:
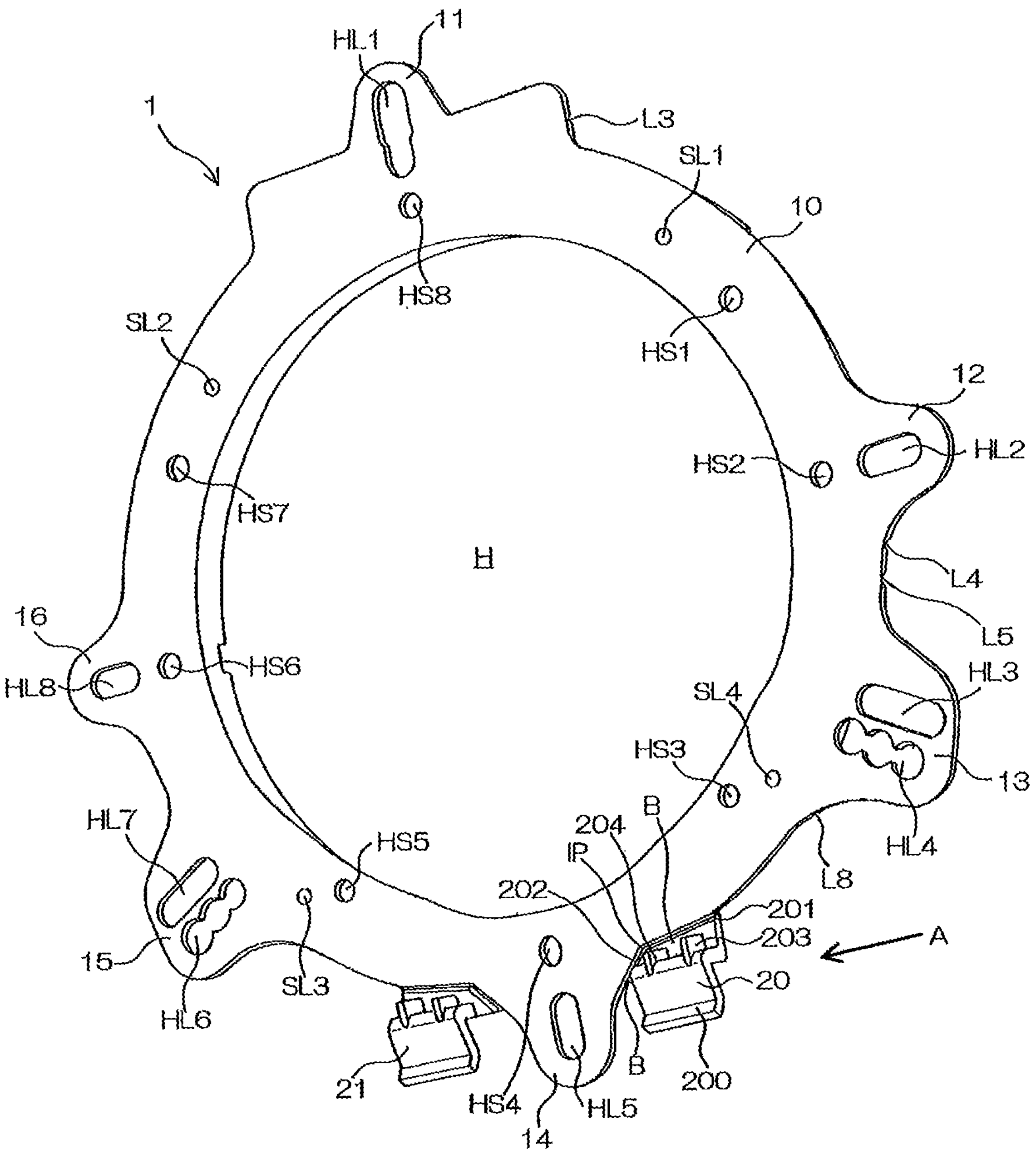
FIG. 3 is a back perspective view showing the configuration of a speaker bracket of an embodiment and an example.

Next, a mode for carrying out the present application is described, with reference to FIGS. 1 to 3. Note that FIG. 1 is an external perspective view showing a usage state and the like of a speaker bracket of an embodiment and an example. FIG. 2 is a front view showing the configuration of the speaker bracket. FIG. 3 is a back-side perspective view of the speaker bracket. Here, in the embodiment and example described below, the surface of each speaker bracket to which the speaker described later is fixed and is thus supported is the front surface, and the surface of the speaker bracket fixed to the lining described later is the back surface, with the speaker being fixed to the speaker bracket. FIG. 1 is also shows an external perspective view of only the outline of the speaker bracket of an embodiment, using dashed lines.

As shown in FIG. 1, a speaker bracket 1 of an embodiment is a member that is interposed between the lining BD of a vehicle door and the speaker SP to be newly installed, for example. With this arrangement, the speaker SP can be attached to the lining BD of a door of a vehicle of any kind. More specifically, the speaker SP is secured to the speaker bracket 1 while being supported with mounting holes p1 to p4, and the speaker bracket 1 in this state is secured to a speaker hole BH of the lining BD with mounting holes h1 and h2 of the lining BD. Therefore, the speaker bracket 1 has two kinds of securing holes: speaker securing holes for supporting and securing the speaker SP with the mounting holes p1 to p4, and bracket securing holes for securing the speaker bracket 1 having the speaker SP fixed thereto to the speaker hole BH with the mounting holes h1 and h2. At this stage, the number and the positions of the mounting hole h1 and the like formed at the circumferential edge portion of the speaker hole BH vary depending on the model of the vehicle in which the speaker SP is installed. Therefore, a plurality of bracket securing holes are formed in the speaker bracket 1 of the embodiment, so that one kind of the speaker bracket 1 can be used for various conceivable models of vehicles.

That is, as shown in FIGS. 1 to 3, the speaker bracket 1 of the embodiment includes a support portion 10 that supports the speaker SP, and a mounting member 20 that is to be used for attaching the speaker SP supported by the support portion 10 to an external portion, and is formed on the support portion 10. A plurality of grooves 201 and 202 having different extending directions is continuously and unitarily formed on a base portion B of the mounting member 20, the base portion B connecting the mounting member 20 and the support portion 10. Each of the grooves 201 and 202 is enclosed by an upper surface of the base portion B respectively.

As described above, in the configuration of the speaker bracket 1 of the embodiment, the plurality of grooves 201 and 202 having different extending directions is continuously formed on the base portion of the mounting member 20 to be used for attaching the speaker SP to an external portion. Thus, it is possible to both maintain the strength for attaching the speaker SP to an external portion with the mounting member 20, and increase the workability in detaching the mounting member when the speaker SP is attached to an external portion without the mounting member 20.

Exemplary Embodiments

Next, a specific example corresponding to the above embodiment is described, with reference to FIGS. 4 to 7, in addition to FIGS. 1 to 3 described above. Note that the example described below is an example in a case where the embodiment is applied to a speaker bracket to be used for detaching the originally secured speaker and securing a new speaker SP to the position from which the speaker has been detached. In this case, in FIGS. 4 to 7, the same reference numerals as those for the respective components in the speaker bracket 1 of the embodiment are used for the respective components of the example corresponding to the respective components of the speaker bracket 1 of the embodiment shown in FIGS. 1 to 3.

Figure 4:
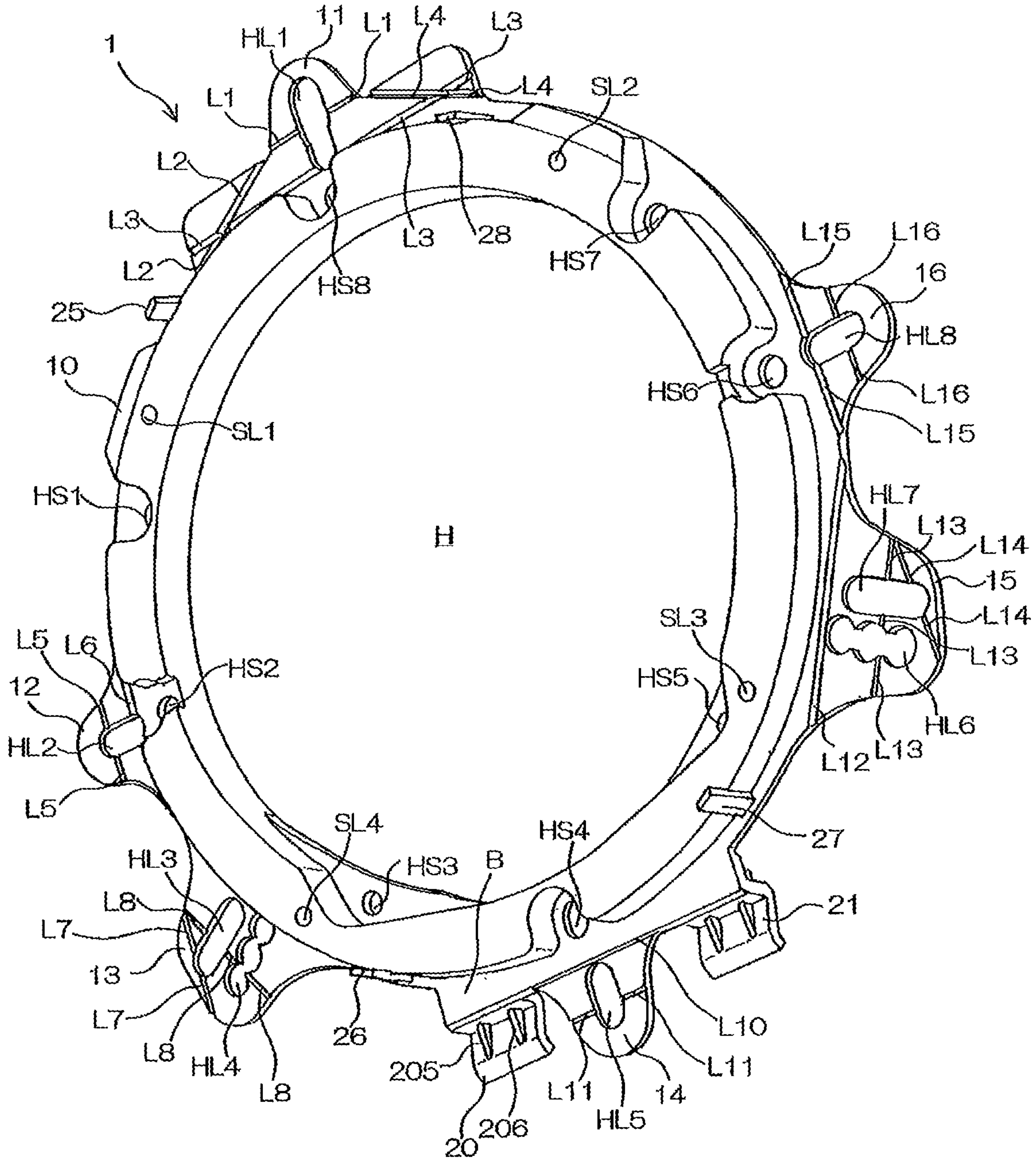
FIG. 4 is a front perspective view showing the configuration of a speaker bracket of an example.

First, the overall structure of a speaker bracket of the example is described, with reference to FIG. 4. Note that FIG. 4 is a front perspective view showing the configuration of the speaker bracket of the example. Further, the speaker bracket of the embodiment described below is formed by integral molding using a resin as a material, for example.

As shown in FIG. 4, the speaker bracket 1 of the example corresponding to the embodiment has, on the circumferential portion of a circular frame-like support portion 10 that matches the outer shape of the speaker SP, a plurality of speaker securing holes SL1 to SL4, a plurality of bracket securing holes HL1 to HL8 and bracket securing holes HS1 to HS8, mounting members 20 and 21 of the example, and protrusions 25 to 28 for positioning when the speaker SP is secured to the speaker bracket 1. In this configuration, the bracket securing holes HL1 to HL8 are long bracket securing holes formed in protruding portions 11 to 16 protruding outward from the outer circumferential edge portion of the support portion 10, each bracket securing hole extending in the radial direction of the support portion 10. Meanwhile, the bracket securing holes HS1 to HS8 are bracket fixing holes in the form of round holes formed in the circumferential portion of the support portion 10. These bracket securing holes HL1 to HL8 and bracket securing holes HS1 to HS8 are used for securing the speaker to the position of the speaker hole BH of the speaker bracket 1, depending on the number and the positions of the mounting hole h1 and the like of the lining BD. On the other hand, the speaker securing holes SL1 to SL4 are the speaker securing holes to be used for securing the speaker SP to the speaker bracket 1, and are formed in the support portion 10 in accordance with the number and the positions of mounting portions p1 to p4 (see FIG. 1) of the speaker SP. Further, the protrusions 25 to 28 are formed as protrusions that have positions and shapes with which the above positioning can be performed, in the circumferential portion of the support portion 10.

In addition to these, the mounting members 20 and 21 of the example are formed on both sides of the protruding portion 14 in the outer circumferential edge portion of the support portion 10. The mounting members 20 and 21 are designed for locking and securing the speaker bracket 1 (that is, hooking the speaker bracket 1 on part of the inner circumferential edge portion of the speaker hole BH of a certain vehicle model). The specific configuration of these mounting members 20 and 21 will be described later in detail, with reference to FIGS. 3, 5, and 6.

Meanwhile, on the surfaces of the respective protruding portions 11 to 16 on the front side, detaching grooves L1 to L16 are formed (or are etched in the surfaces) in accordance with the number and the positions of the mounting hole h1 and the like of the speaker hole BH in any of the conceivable vehicle models to which the speaker bracket 1 can be secured. Each of these detaching grooves L1 to L16 is a detaching groove for detaching the portion outside the detaching grooves L1 to L16 from the support portion 10, depending on the conceivable vehicle models. This detaching is performed by cutting the detaching grooves, or bending and removing the outer portion, for example.

Figure 5A:
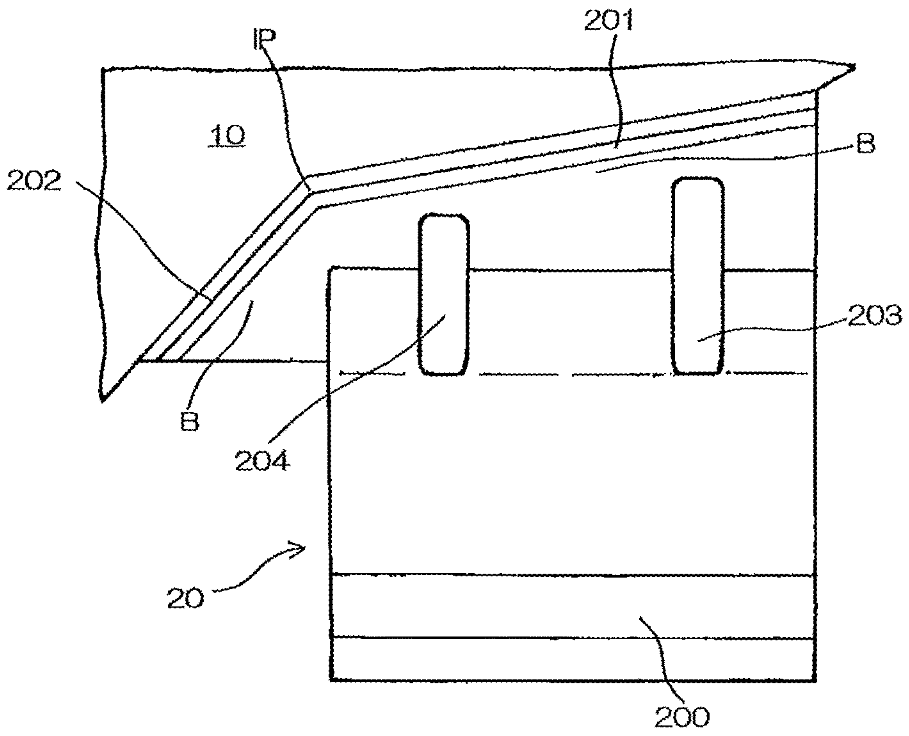
FIGS. 5(*a*) and 5(*b*) are enlarged back views and the like showing the configuration of a mounting member of an example.
Figure 5B:
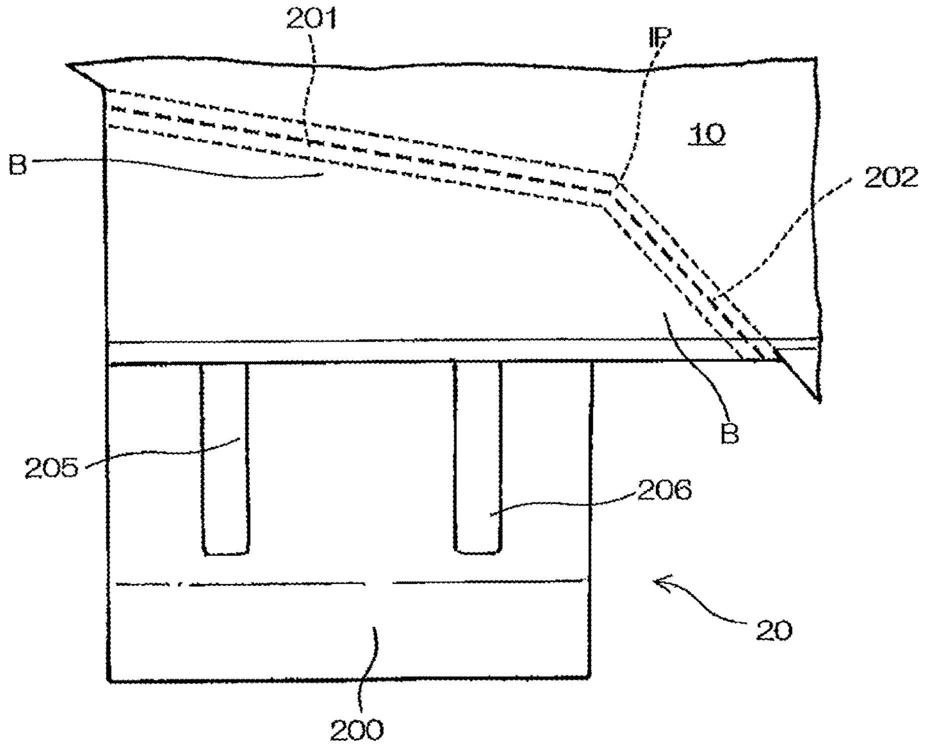
Figure 6B:
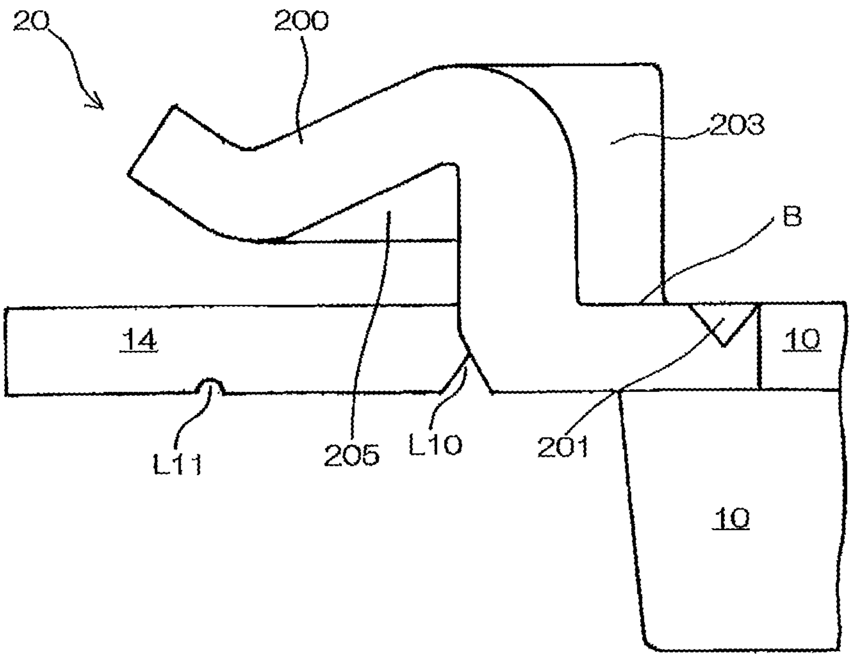
FIGS. 6(*a*) and 6(*b*) are enlarged side views and the like showing the configuration of a mounting member of an example.
Figure 6B:
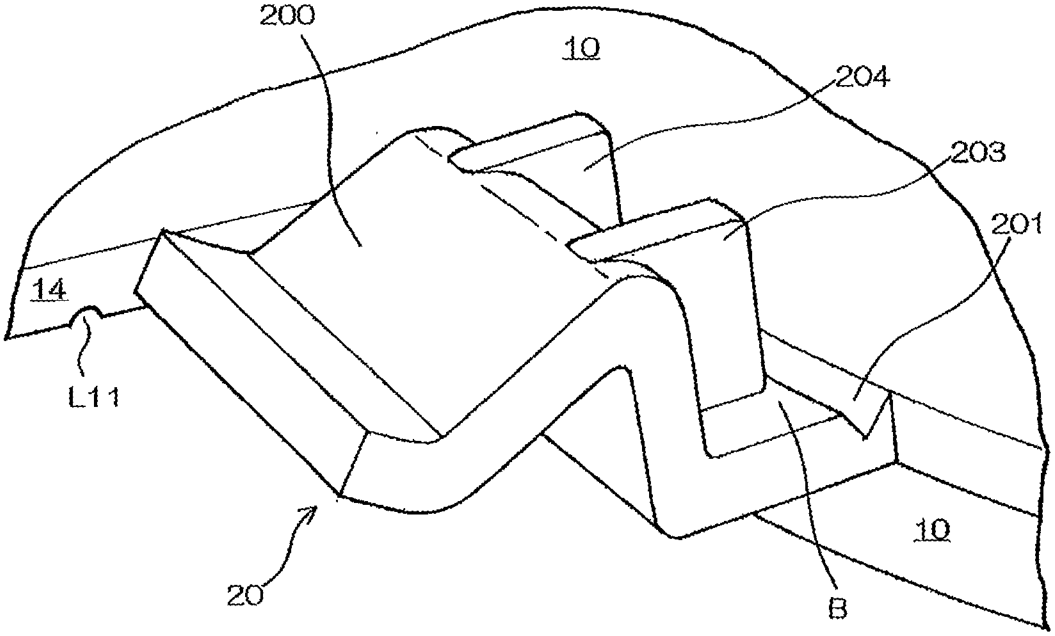
Figure 7A:
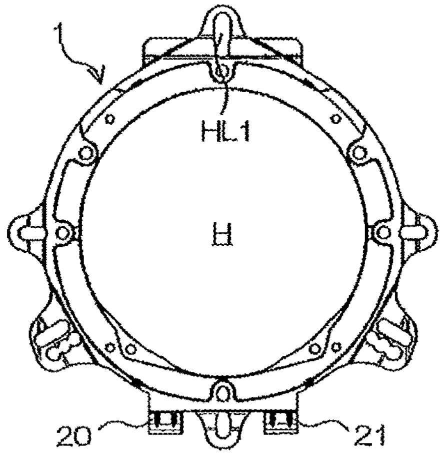
FIGS. 7(*a*)-(*f*) show a front view for explaining usage modes of a speaker bracket of an example.
Figure 7B:
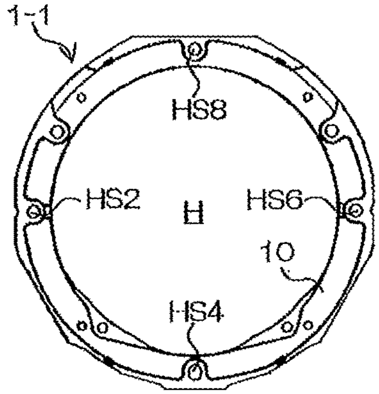
Figure 7C:
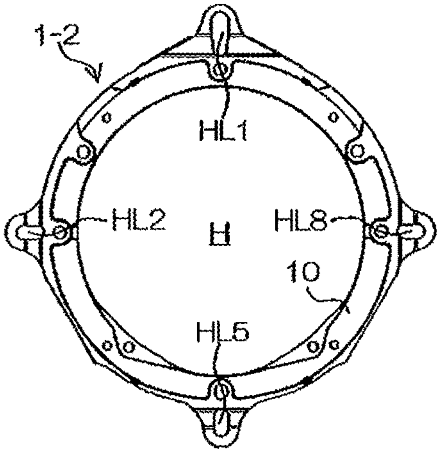
Figure 7D:
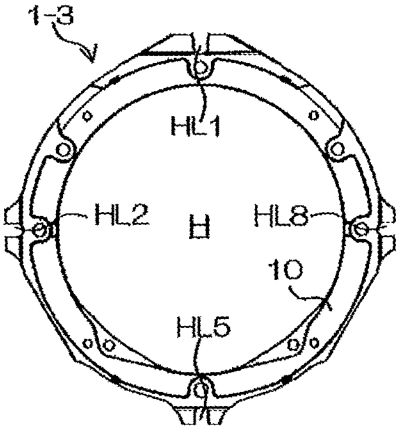
Figure 7E:
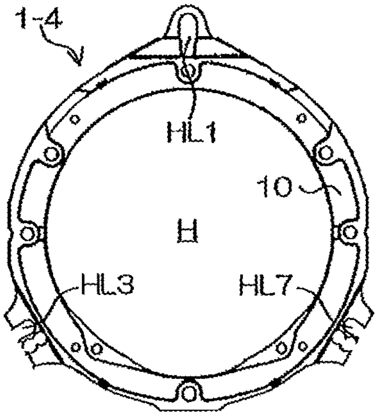
Figure 7F:
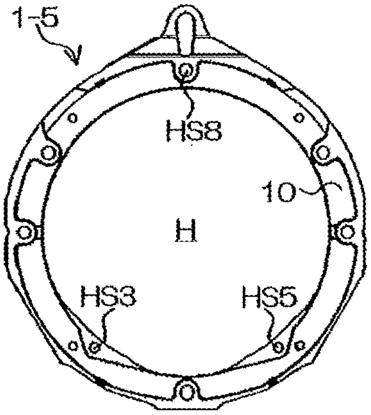

Next, the specific configuration of the mounting members 20 and 21 of the example is described in greater detail, with reference to FIGS. 3, 5(*a*), 5(*b*), 6(*a*), and 6(*b*). Note that FIGS. 5(*a*) and 5(*b*) are enlarged back views and the like showing the configuration of mounting member of the example. FIGS. 6(*a*) and 6(*b*) are enlarged side views and the like showing the configuration of the mounting member. In this case, FIG. 5(*a*) is an enlarged side view of the mounting member 20 as viewed from the direction A defined in FIG. 3. Further, in FIG. 5(*b*), detaching grooves 201 and 202 and a bend point IP, which will be described later, formed on the back surface side of the mounting member 20 are indicated by dashed lines. Further, the mounting members 20 and 21 have line-symmetric positions and shapes, with the axis of symmetry being the radius of the support portion 10 extending through the bracket securing holes HL5 and HS4 of the protruding portion 14. Therefore, in the description below, the specific configuration of the mounting member 20 will be described as a typical configuration of the mounting members 20 and 21.

FIG. 5(*a*) shows an enlarged back view, FIG. 5(*b*) shows an enlarged front view, FIG. 6(*a*) shows an enlarged side view, and FIG. 6(*b*) shows an enlarged back perspective view of the mounting member of the example. As shown in these drawings, the mounting member 20 is formed with a locking portion 200 that has reinforcement ribs 203 and 204 formed on the back surface, and reinforcement ribs 205 and 206 formed on the front surface. Further, on the back surface side of the base portion B of the mounting member that connects the mounting member 20 having the locking portion 200 to the support portion 10 (that is, the base portion B of the mounting member 20 that exists in the same plane as the surface on the back side of the support portion 10 and connects the support portion 10 and the mounting member 20), the detaching grooves 201 and 202 for detaching the mounting member 20 from the support portion 10 are formed on the surface (or are etched in the surface). The detaching groove 201 corresponds to an example of the groove 201 of the embodiment, and the detaching groove 202 corresponds to an example of the groove 202 of the embodiment. In this case, the detaching grooves 201 and 202 are linear continuous grooves that are bent at the bend portion IP, and its cross-section is substantially a V-shaped cross-section. Further, the detaching grooves 201 and 202 are cut, or the mounting member 20 is bent and removed from the detaching grooves 201 and 202, so that the mounting member 20 can be detached from the support portion 10 as necessary. With this configuration, when the speaker SP is attached to an external portion (the lining BD of a vehicle door, for example), the mounting member can be detached from the speaker bracket 1 in accordance with the shape of the mounting portion of the external portion.

Note that the depth of each of the detaching grooves 201 and 202 is preferably a depth equivalent to 1% to 30% of the thickness of the base portion B, from the viewpoint of the mounting strength of the speaker SP with the mounting members 20 and 21, for example. Further, the length, the width, and the bending angle at the bend portion IP of each of the detaching grooves 201 and 202 are set so that the position to which the mounting member 20 was attached in the support portion 10 has, after the detachment of the mounting member a shape in conformity with the shape of the inner circumferential edge of the position facing the position of the support portion 10 to which the mounting member 20 was attached in the speaker hole BH to which the speaker bracket 1 is secured without the mounting member 20.

Next, usage modes of the speaker bracket 1 of the example are specifically described, with reference to FIG. 7. Note that FIG. 7 is front views each for explaining a usage mode of the speaker bracket.

For example, in a case where the speaker bracket 1 is secured to the speaker hole BH of a first vehicle model, the speaker bracket 1 leaves the mounting members 20 and 21 thereon, and is used so that the mounting members 20 and 21 are positioned below the center of the speaker bracket 1 in a vertical direction, for example, as shown in the front view in FIG. 7(*a*). The speaker bracket 1 is then secured to the speaker hole BH by the locking with the mounting members 20 and 21, and the securement using the bracket securing hole HL1, for example. In this case, the other bracket securing hole HS2 and the like are not used.

Also, in a case where the speaker bracket 1 is secured to the speaker hole BH of a second vehicle model, for example, the speaker bracket 1 is used as a speaker bracket 1-1 having its outer portion detached from each of the detaching grooves L3, L6, L9, L10, L12, and L15, as shown in the front view in FIG. 7(*b*). In this case, the mounting members 20 and 21 described above are also detached and are then used. The bracket securing holes HS2, HS4, HS6, and HS8 are then used as the actual bracket securing holes, and the other bracket securing hole HL1 and the like are not used.

Further, in a case where the speaker bracket 1 is secured to the speaker hole BH of a third vehicle model, for example, the speaker bracket 1 is used as a speaker bracket 1-2 having its outer portion detached from each of the detaching grooves L2, L4, L9, and L12, as shown in the front view in FIG. 7(*c*). In this case, the mounting members 20 and 21 described above are also detached and are then used. The bracket securing holes HL1, HL2, HL5, and HL8 are then used as the actual bracket securing holes, and the other bracket securing hole HS2 and the like are not used.

Furthermore, in a case where the speaker bracket 1 is secured to the speaker hole BH of a fourth vehicle model, for example, the speaker bracket 1 is used as a speaker bracket 1-3 having its outer portion detached from each of the detaching grooves L1, L2, L4, L5, L9, L11, L12, and L16, as shown in the front view in FIG. 7(*d*). In this case, the mounting members 20 and 21 described above are also detached and are then used. The bracket securing holes HL1, HL2, HL5, and HL8 are then used as the actual bracket securing holes, and the other bracket securing hole HS2 and the like are not used.

Also, in a case where the speaker bracket 1 is secured to the speaker hole BH of a fifth vehicle model, for example, the speaker bracket 1 is used as a speaker bracket 1-4 having its outer portion detached from each of the detaching grooves L2, L4, L6, L8, L10, L13, and L15, as shown in the front view in FIG. 7(*e*). In this case, the mounting members 20 and 21 described above are also detached and are then used. The bracket securing holes HL1, HL3, and HS7 are then used as the actual bracket securing holes, and the other bracket securing hole HS2 and the like are not used.

Lastly, in a case where the speaker bracket 1 is secured to the speaker hole BH of a sixth vehicle model, for example, the speaker bracket 1 is used as a speaker bracket 1-5 having its outer portion detached from each of the detaching grooves L2, L4, L6, L9, L10, L12, and L15, as shown in the front view in FIG. 7(*f*). In this case, the mounting members 20 and 21 described above are also detached and are then used. The bracket securing holes HS8, HS3, and HS5 are then used as the actual bracket securing holes, and the other bracket securing hole HL1 and the like are not used.

Note that, although the above detaching grooves L1 to L16 have been described as linear grooves with reference to FIGS. 2, 4, and 7, these detaching grooves may be curved detaching grooves.

As described above, in the configuration of the speaker bracket 1 of the example, the plurality of detaching grooves 201 and 202 having different extending directions is continuously formed on the base portion B of the mounting member 20 to be used for attaching the speaker SP to the speaker hole BH. Thus, it is possible to both maintain the strength for attaching the speaker SP to the lining BD with the mounting member 20, and increase the workability in detaching the mounting member when the speaker SP is attached to the lining BD without the mounting member 20.

Further, as the detaching groove 201 and 202 are a plurality of linear grooves connected at one bend point IP, the detaching grooves 201 and 202 can be formed by a simple process, while the strength is maintained, and the workability is increased.

Furthermore, the overall shape (see FIGS. 5(*a*), 5(*b*)) of the detaching grooves 201 and 202 viewed from a direction perpendicular to the extending direction of each of the detaching grooves 201 and 202 is a shape in conformity with the shape of the speaker hole BH to which the speaker SP is attached via the speaker bracket 1 after detachment of the mounting member 20. Thus, it is possible to mount the speaker SP in the required region without fail, using the speaker bracket 1 after the mounting member 20 is detached.

Also, the detaching grooves 201 and 202 are formed only on one surface (which is the surface on the back surface side) of the plate-like base portion B (see FIGS. 5(*a*), 5(*b*), 6(*a*), and 6(*b*)). Thus, it is possible to maintain sufficient strength when the speaker SP is attached to an external portion with the mounting member 20.

Modifications

Figure 8A:
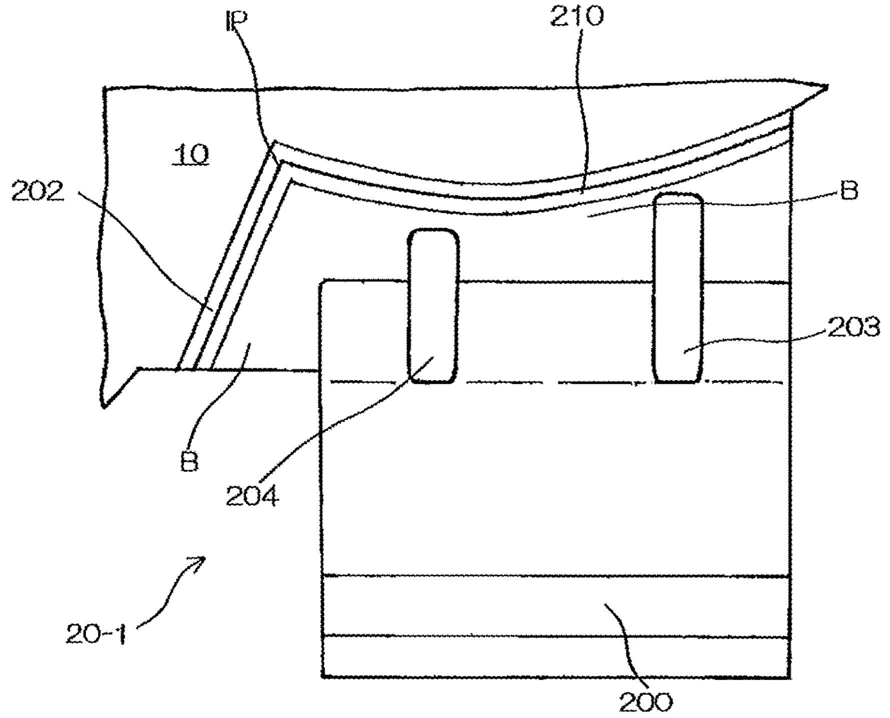
FIGS. 8(*a*) and 8(*b*) are enlarged back views (I) showing the configuration of a mounting member of each modification.
Figure 8B:
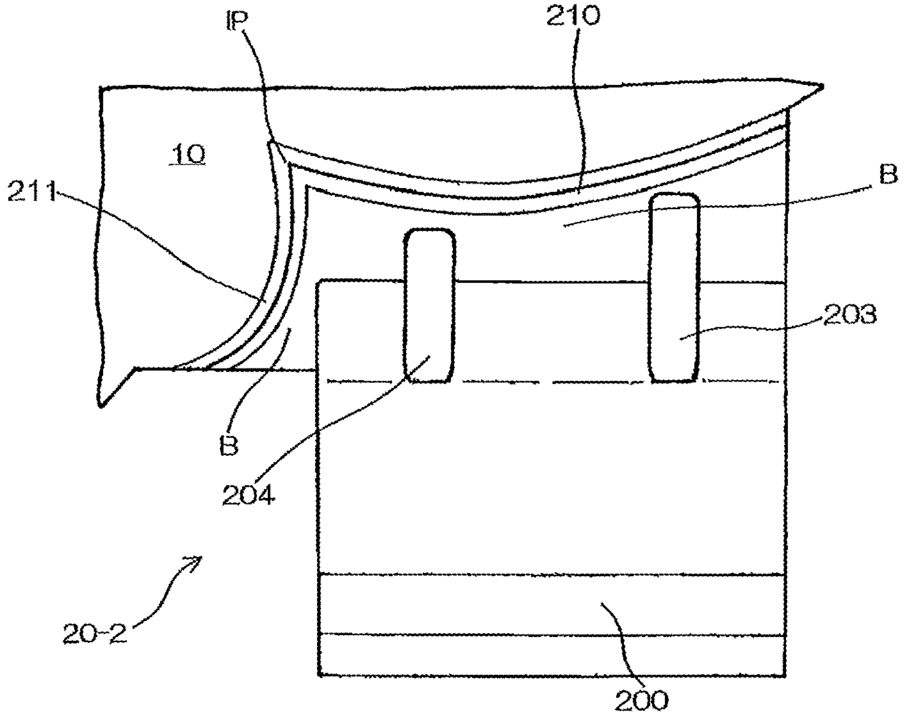

Next, modifications corresponding to the embodiment are described, with reference to FIGS. 8(*a*), 8(*b*), 9(*a*), and 9(*b*). Note that FIGS. 8(*a*), 8(*b*), 9(*a*), and 9(*b*) are enlarged back views showing the configurations of mounting members of the respective modifications. Also, in FIGS. 8(*a*), 8(*b*), 9(*a*), and 9(*b*), the same components as the mounting member 20 and the support portion 10 of the example are denoted by the same reference numerals, and detailed explanation thereof will not be repeated.

(I) First Modification

First, the configuration of a mounting member of a first modification is described, with reference to FIG. 8(*a*). As shown in its enlarged back view in FIG. 8(*a*), in a mounting member 20-1 of the first modification, a detaching groove continuously formed in the same detaching groove 202 as that of the example via a bend portion IP is not a linear groove but a curved detaching groove 210 that protrudes toward the mounting member 20. This detaching groove 210 corresponds to another example of the groove 201 of the embodiment. The other aspects of the configuration of the mounting member 20-1 of the first modification are the same as those of the configuration of the mounting member 20 of the example, and therefore, detailed explanation thereof is not made herein. In the configuration of the mounting member 20-1 of the first modification, the portion around the center of the detaching groove 210 protrudes downward in a vertical direction (see the usage mode shown in FIG. 7(*a*)) at the time of installment of the speaker SP with the mounting members 20 and 21. As a result, in a case where rain enters the back side of the speaker SP after the installation, for example, even if moisture due to the rain enters from the right side of the detaching groove 210 in FIG. 8(*a*), the moisture can be stored in the protruding portion. Thus, it is possible to prevent the moisture from dripping down (which will result in leaking of rain). Note that, in the curved detaching groove 210 and the like of the first to fourth modifications, the tangential direction of the curve is the extending direction of the detaching groove 210 and the like.

(II) Second Modification

Next, the configuration of a mounting member of a second modification is described, with reference to FIG. 8(*b*). As shown in its enlarged back view in FIG. 8(*b*), in a mounting member 20-2 of the second modification, the same curved detaching groove 210 as that of the first modification, and a curved detaching groove 211 that protrudes toward the mounting member 20 like the detaching groove 210 are continuously formed on the base portion B via a bend portion IP. This detaching groove 211 corresponds to another example of the groove 202 of the embodiment. The other aspects of the configuration of the mounting member 20-2 of the second modification are the same as those of the configuration of the mounting member 20-1 of the first example, and therefore, detailed explanation thereof is not made herein. Note that the detaching groove 210 of the mounting member 20-2 of the second modification also has the effect to prevent rain leakage like the detaching groove 210 of the above first modification.

(III) Third Modification

Figure 9A:
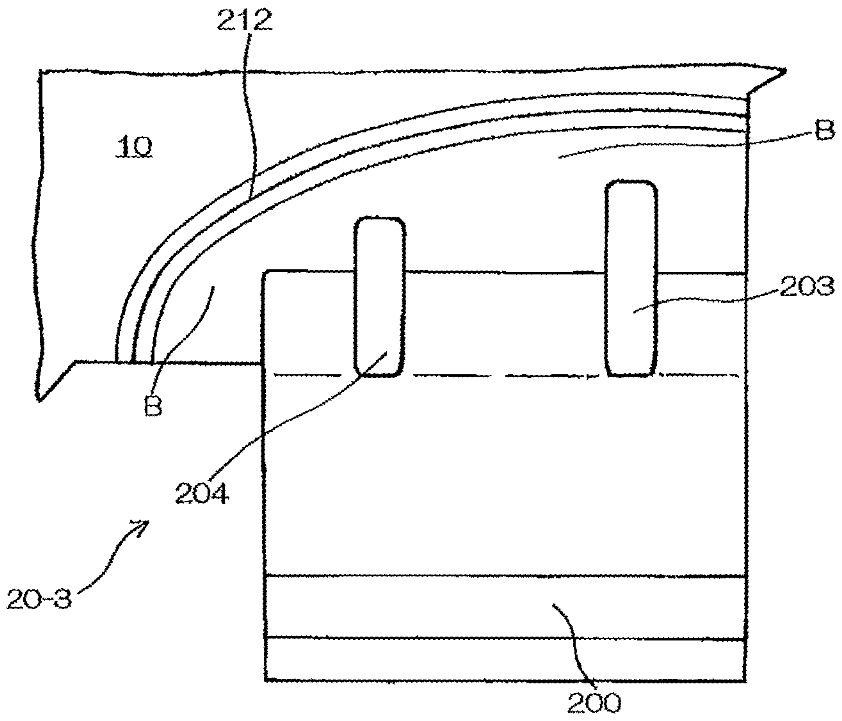
FIGS. 9(*a*) and 9(*b*) are enlarged back views (II) showing the configuration of a mounting member of each modification.
Figure 9B:
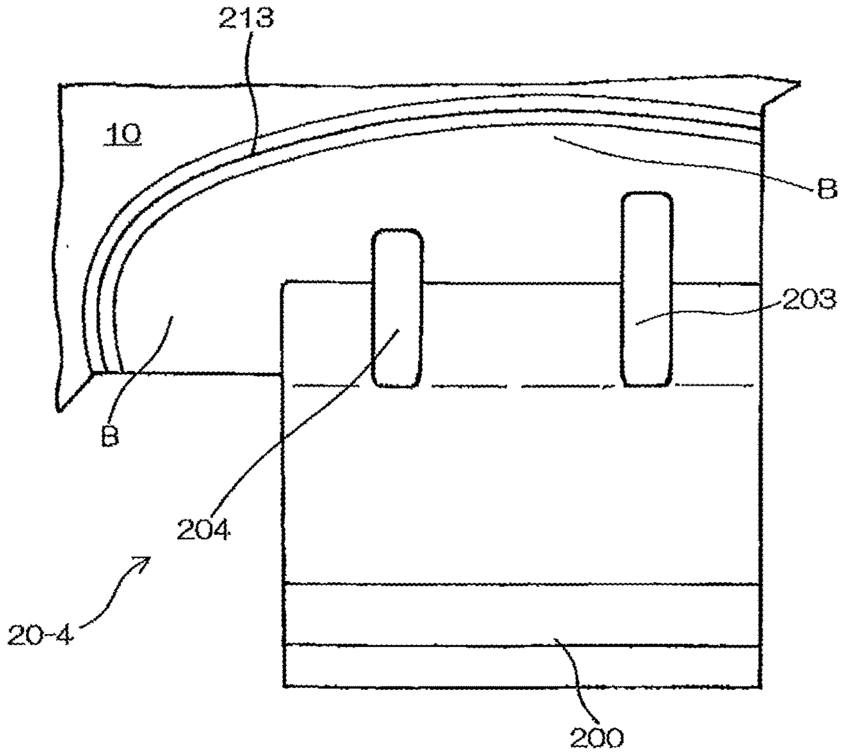

Next, the configuration of a mounting member of a third modification is described, with reference to FIG. 9(*a*). As shown in its enlarged back view in FIG. 9(*a*), a mounting member 20-3 of the third modification does not have the bend portion IP by which the detaching grooves 201 and 202 of the example are connected, but has only a curved detaching groove 212 formed therein. This detaching groove 212 corresponds to yet another example of the groove 201 of the embodiment, and yet another example of the groove 202 of the embodiment. The other aspects of the configuration of the mounting member 20-3 of the third modification are the same as those of the configuration of the mounting member 20 of the example, and therefore, detailed explanation thereof is not made herein.

(IV) Fourth Modification

Lastly, the configuration of a mounting member of a fourth modification is described, with reference to FIG. 9(*b*).

As shown in its enlarged back view in FIG. 9(*b*), a mounting member 20-4 of the fourth modification does not have the bend portion IP like the mounting member 20-3 of the third example, but has only a curved detaching groove 213 having a different shape from that of the detaching groove 212 of the third example. This detaching groove 213 corresponds to still another example of the groove 201 of the embodiment, and still another example of the groove 202 of the embodiment. The other aspects of the configuration of the mounting member 20-4 of the fourth modification are the same as those of the configuration of the mounting member 20 of the example, and therefore, detailed explanation thereof is not made herein.

As described so far, in the configuration of the mounting member 20-1 or the like of each modification, the detaching groove 210 or the like includes a curved groove. Thus, the detaching groove 210 or the like can be formed by a simple process, while the strength is maintained, and the workability is increased.

Also, in the configurations of the mounting member 20-2 of the second modification, the mounting member 20-3 of the third modification, and the mounting member 20-4 of the fourth modification, the entire detaching grooves 210 to 213 are formed as entirely curved grooves. Thus, the detaching grooves can be formed by a simple process, while the strength is maintained, and the workability is increased.

Note that, in the example, the first modification, and the second modification described above, the bend portion IP is formed only at one point. However, a detaching groove may be formed with a linear or curved groove in which a plurality of bend points is formed. Also, a cross-section of the detaching groove 201 or the like described above is substantially a V-shaped cross-section. However, the detaching groove 201 or the like may be formed with a groove having a rectangular cross-section with a bottom surface in its extending direction, a groove having a semicircular cross-section, or a groove having a U-shaped cross-section.

Further, in the cases described above in the example and the respective modifications, the detaching groove 201 or the like is formed on the back surface side of the base portion B of the mounting member 20. However, the detaching groove 201 or the like may be formed on the surface on the front surface side of the base portion B, the support portion 10, or the mounting members 20 and 21.

Further, in the cases described above in the example and the respective modifications, the present application is applied to the speaker bracket 1 that is interposed between the speaker SP and the lining BD, and secures the speaker SP to the lining BD. However, the configuration itself of the speaker frame that is in the form of a frame and supports the diaphragm of the speaker to be attached to the lining BD, or the outer circumferential edge itself of the speaker may be the same as the configuration of the speaker bracket 1 that includes the mounting members 20 and 21 of the example, or the mounting member 20-1 or the like of each of the modification described above. In this case, the same effects as those of the example described above or each of the modifications described above can be achieved.

Furthermore, in the cases described above in the example and the respective modifications, the back surface of the circumferential portion of the support portion 10 is flat (see FIG. 3). However, a lightening portion for weight reduction may be formed at a position other than the positions of the bracket securing hole HS1 and the like on the back surface of the circumferential portion.

Also, in the example and the respective modifications described above, the entire speaker bracket 1 is formed by integral molding using a resin. However, part of the speaker bracket 1 may be made of a different material.

EXPLANATION OF REFERENCE NUMERALS

| | |
|---|---|
| 1, 1-1, 1-2, 1-3, 1-4, 1-5 | Speaker bracket |
| 10 | Support portion |
| 20, 20-1, 20-2, 20-3, 20-4, 21 | Mounting member |
| 201, 202, 210, 211, 212, 213 | Detaching groove |
| SP | Speaker |
| BH | Speaker hole |
| IP | Bending portion |
| B | Base portion |

The invention claimed is:

1. A speaker bracket comprising:

a support portion that supports a speaker; and a mounting member that is used for attaching the speaker supported by the support portion to an external portion, the mounting member being formed on the support portion, wherein a plurality of grooves having different extending directions is continuously and unitarily formed on a base portion of the mounting member, the base portion connecting the mounting member and the support portion, wherein each of the grooves is formed only on one surface of the base portion that has a flat shape, and wherein the each of the grooves is enclosed by an upper surface of the base portion respectively.

2. The speaker bracket according to claim 1, wherein the mounting member comprises a plurality of two reinforcement ribs on a surface on which the plurality of grooves is formed.

3. The speaker bracket according to claim 2, wherein lengths of the reinforcement ribs in a direction in which the mounting member extends, when viewed from a position of the support portion, are different from each other.

4. The speaker bracket according to claim 1, wherein each of the plurality of the grooves is a linear groove.

5. The speaker bracket according to claim 1, wherein the speaker bracket comprises two mounting members including the mounting member and another mounting member.

6. The speaker bracket according to claim 1, wherein a depth of each of the grooves is 1% to 30% of a thickness of the base portion.

7. A speaker frame comprising:

a diaphragm support portion that supports a diaphragm of a speaker; and a mounting member that is used for attaching the speaker, having the diaphragm support portion, to an external portion, the mounting member being formed on the diaphragm support portion, wherein a plurality of grooves, having different extending directions, is continuously and unitarily formed on a base portion of the mounting member, the base portion connecting the mounting member and the diaphragm support portion, wherein each of the grooves is formed only on one surface of the base portion that has a flat shape, and wherein the each of the grooves is enclosed by an upper surface of the base portion respectively.

8. The speaker frame according to claim 7, wherein the mounting member comprises two reinforcement ribs on a surface on which the plurality of grooves is formed.

9. The speaker frame according to claim 8, wherein lengths of the reinforcement ribs in a direction in which the mounting member extends, when viewed from a position of the support portion, are different from each other.

10. The speaker frame according to claim 7, wherein each of the plurality of the grooves is a linear groove.

11. The speaker frame according to claim 7, wherein the speaker frame comprises two mounting members including the mounting member and another mounting member.

12. The speaker frame according to claim 7, wherein a depth of each of the grooves is 1% to 30% of a thickness of the base portion.

13. A speaker comprising:

a diaphragm support portion that supports a diaphragm; and a mounting member that is formed on the diaphragm support portion, the mounting member being for attaching the speaker to an external portion, wherein a plurality of grooves, having different extending directions, is continuously and unitarily formed on a base portion of the mounting member, the base portion connecting the mounting member and the diaphragm support portion, wherein each of the grooves is formed only on one surface of the base portion that has a flat shape, and wherein the each of the grooves is enclosed by an upper surface of the base portion respectively.

14. The speaker according to claim 13, wherein the mounting member comprises two reinforcement ribs on a surface on which the plurality of grooves is formed.

15. The speaker according to claim 14, wherein lengths of the reinforcement ribs in a direction in which the mounting member extends, when viewed from a position of the support portion, are different from each other.

16. The speaker according to claim 13, wherein each of the plurality of the grooves is a linear groove.

17. The speaker according to claim 13, wherein the speaker comprises two mounting members including the mounting member and another mounting member.

18. The speaker according to claim 13, wherein a depth of each of the grooves is 1% to 30% of a thickness of the base portion.

19. The speaker bracket according to claim 1, wherein a bottom surface of the each of the grooves is defined by the upper surface of the base portion.

20. The speaker bracket according to claim 1, wherein the each of the grooves includes side surfaces that continuously extend from a top surface of the each of the grooves to a bottom surface of the each of the grooves, and wherein the bottom surface of the each of the grooves encloses an entirety of an area between the side surfaces of the each of the grooves.

* * * * *